United States Patent [19]

Kanamori et al.

[11] Patent Number: 5,422,975
[45] Date of Patent: Jun. 6, 1995

[54] OPTICAL FILTER DOPED WITH RARE EARTH ELEMENTS AND USED WITH OPTICAL FIBERS

[75] Inventors: Hiroo Kanamori; Akira Urano; Tomonori Kashiwara, all of Yokoyama; Izumi Sankawa, Setagaya, all of Japan

[73] Assignees: Sumitomo Electric Industries, Ltd., Osaka; Nippon Telegraph & Telephone Corporation, Tokyo, both of Japan

[21] Appl. No.: 159,923

[22] Filed: Dec. 1, 1993

[30] Foreign Application Priority Data

Dec. 2, 1992 [JP] Japan ................... 4-323278

[51] Int. Cl.⁶ ................... G02B 6/22; G02B 6/24
[52] U.S. Cl. ................... 385/140; 385/27; 385/31; 385/39; 385/49; 385/141; 385/142; 385/144
[58] Field of Search ................... 385/15, 27, 29, 30, 385/31, 32, 39, 49, 123, 126, 127, 128, 131, 132, 122, 140, 141, 142, 143, 144, 145; 372/6; 359/333, 341, 342, 343, 344, 345

[56] References Cited

U.S. PATENT DOCUMENTS

| | | | |
|---|---|---|---|
| 4,482,204 | 11/1984 | Blyler, Jr. et al. | 385/142 X |
| 4,637,025 | 1/1987 | Snitzer et al. | 372/1 |
| 4,782,491 | 11/1988 | Snitzer | 372/6 |
| 4,815,079 | 3/1989 | Snitzer et al. | 372/6 |
| 5,067,789 | 11/1991 | Hall et al. | 385/27 |
| 5,121,460 | 6/1992 | Tumminelli et al. | 385/126 |
| 5,131,069 | 7/1992 | Hall et al. | 385/142 |
| 5,216,728 | 6/1993 | Charlton et al. | 385/27 |
| 5,257,335 | 10/1993 | Kurata et al. | 385/78 |
| 5,276,701 | 1/1994 | Shirasaki | 385/140 X |
| 5,325,459 | 6/1994 | Schmidt | 385/140 |

FOREIGN PATENT DOCUMENTS 9210887 6/1992 WIPO ................ 385/142 X

OTHER PUBLICATIONS

Patent Abstracts of Japan, vol. 12, No. 461 (E-689), Dec. 5, 1988, JP-A-63 184 386 (Furukawa Electric, Jul. 29, 1988.

*Primary Examiner*—Brian Healy
*Attorney, Agent, or Firm*—Cushman Darby & Cushman

[57] ABSTRACT

An object of this invention is to provide an optical filter which has higher mass-producibility and economy. This feature can be realized by doped a rare earth element into the region of a glass material which can transmit light. In a case that Er and Tm are doped as the rare earth element into the region, a ratio $\alpha_{Er}/\alpha_{Tm}$ between a contribution $\alpha_{Er}$ of Er to attenuation and a contribution $\alpha_{Tm}$ of Tm to attenuation is set in a range from about 1 to 1/25 for a 1.5 μm band range, whereby attenuation in this wavelength range is retained above 50 dB/m to realize required cutoff function.

16 Claims, 9 Drawing Sheets

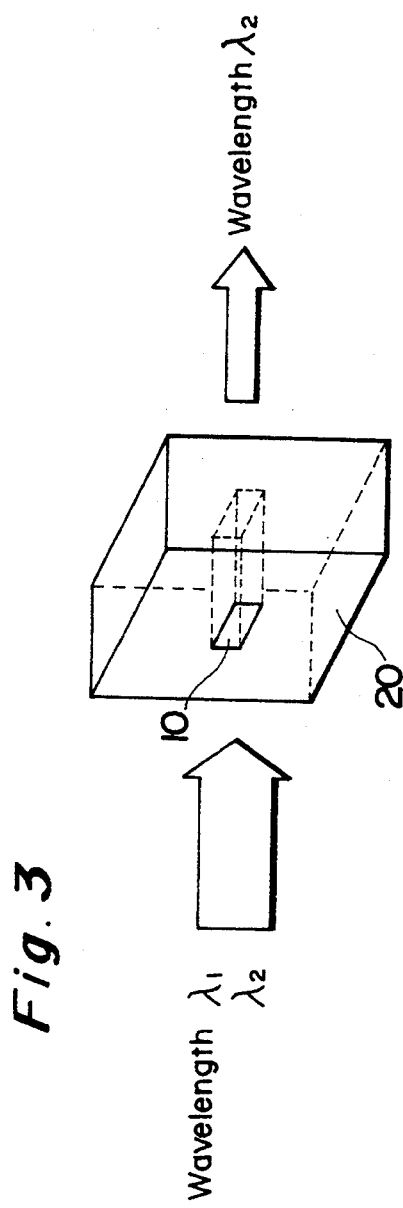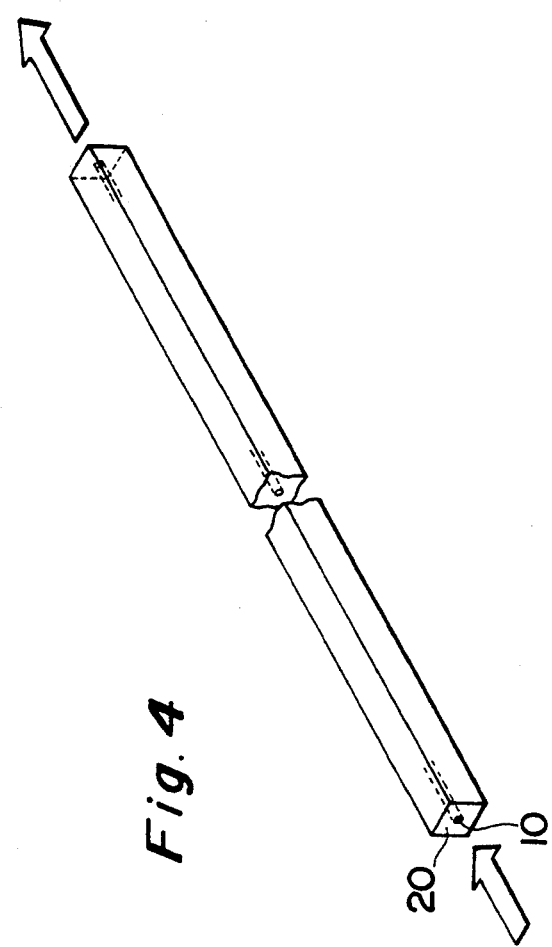

OPTICAL FILTER DOPED WITH RARE EARTH ELEMENTS AND USED WITH OPTICAL FIBERS

BACKGROUND OF THE INVENTION

1. Field of the Invention

This invention relates to an optical filter for passing light of a specific wavelength, specifically an optical fiber, which in use in an optical transmission path of an optical fiber, has good coupling property with the optical fiber for the optical transmission.

2. Related Background Art

In optical communication generally a 1.3 μm-band light and a 1.55 μm-band light are used. When both wavelength ranges are transmitted, the 1.3 μm-band light or the 1.5 μm-band light have to be selected on the side of an optical receiver.

A dielectric multi-layer film filter among a light transmitting optical part has been conventionally used as an optical part having wavelength selectivity (the function of passing a specific wavelength and reflecting the other wavelengths). Such dielectric multi-layer film filter comprises a multi-layer of dielectrics of different refractive indexes to cause reflected light on the interfaces between the respective thin films to interfere with one another, whereby a specific wavelength can be selected.

Specifically, in using the above-described conventional optical filter in a communication system using optical fibers as an optical transmission path, in view of the coupling property (low excess insertion loss) of the optical filter, the optical fibers are micro-machined (as described in "Development of Fiber optic Passive Devices", Fukuma et al., Sumitomo Denki, March, 1990, No. 136, pp 60–67) to receive the multi-layer film filter between the optical fibers.

FIGS. 1 and 2 show the steps of fabricating the above-described optical filter. Following these steps, first, a part of the coating of an optical fiber is longitudinally removed, and the optical fiber 2 is fixed to a substrate 1 by means of an adhesive 3, with V-shaped grooves beforehand formed therein (FIG. 1).

Then, a groove 4 is cut in the part of the optical fiber 2 with the coating removed and in the substrate 1 at a set angle θ to the axis X of the optical fiber 2. Next, a dielectric multi-layer film filter 5 comprising dielectrics of different refractive indexes laid alternately one on another on a thin film substrate glass is inserted into the groove 4, and then filter 5 is fixed by an adhesive (FIG. 2).

The insertion of the multi-layer film filter 5 at the set angle θ to the axis X of the optical fiber 2 is for preventing wavelengths which have not been admitted through the dielectric multi-layer film filter 5 from returning to the side of incidence of light.

Thus, the conventional optical filter is fabricated by following many steps of machining the optical fiber, fabricating and machining the dielectric multi-layer film filter, inserting and securing the filter in the optical fiber path, and other steps.

SUMMARY OF THE INVENTION

An object of this invention is to provide an optical filter which can be economically mass-produced and simply fabricated.

An optical filter according to a first embodiment of this invention comprises a first region for propagating light formed of a glass material doped with a rare earth element which selectively absorbs light of a specific wavelength and a second region for confining light propagating through the first region formed of a glass material with a lower refractive index than the first region and covering the first region.

The rare earth element doped into the first region is preferably an element which exhibits the function of selecting a required wavelength in a band which is important especially to the optical communication and typically erbium (Er) and thulium (Tm). The first region may be doped with Er alone, Tm alone, or both of Er and Tm.

In the first region doped with Er and Tm, a ratio $\alpha_{Er}/\alpha_{Tm}$ between a contribution of Er to attenuation in the first region and a contribution $\alpha_{Tm}$ of Tm to attenuation in the first region is set in a range from about 1 to 1/25 for light of a 1.5 μm band propagating through the first region.

In a first application of the first embodiment, the first region includes a region doped with Er and a region doped with Tm.

In a second application of the first embodiment, a first optical filter having the first region doped with Er, and a second optical filter having the first region doped with Tm, which are serially connected in the direction of propagation of light.

An optical filter according to a second embodiment is elongated in the direction of propagation of light.

In an application of the second embodiment, an optical fiber comprises a core region in a special structure and a cladding region. The core region includes a region doped with Er alone and a region doped with Tm alone. The regions have refractive indexes from each other. According to this embodiment, a fiber optic filter having a required filtering function can be realized.

In a first application of the second embodiment, in the same manner as in the first application of the first embodiment, a core region (corresponding to the first region) includes a region doped with Er and a region doped with Tm.

In a second application of the second embodiment, in the same manner as in the second application of the first embodiment, a first optical fiber having the core region doped with Er, and a second optical fiber having the core region doped with Tm, which are serially connected, whereby a fiber optic filter is realized.

According to the optical filter of this invention, erbium (Er) and thulium (Tm) which have transmission characteristic in a 1.3 μm band and cutoff characteristic in a 1.55 μm band are selectively or both doped into the first region (or the core region) of the an optical fiber for propagating light, whereby a fiber optic filter of a glass material can be realized.

Adjustment of the wavelength selecting function of the optical filter according to this invention can be realized, in the second application of the first embodiment, by adjusting respective lengths of the first and the second optical filters in the direction of propagation of light.

In the second application of the second embodiment, in which the first optical fiber and the second optical fiber are serially connected to each other, the wavelength selecting function of the optical filter can be adjusted by the adjustment of respective lengths of the optical fibers.

Furthermore, a ratio $\alpha_{Er}/\alpha_{Tm}$ between a contribution $\alpha_{Er}$ of Er to attenuation in the first region and a contribution of $\alpha_{Tm}$ to attenuation in the first region is set in a range from about 1 to 1/25 for 1.5 μm-band light propagating through the first region, whereby attenuation in this band can be retained at above 50 dB/m. Thus an optical fiber of a required cutoff function can be realized.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a structural view of the optical filter according to a first embodiment of this invention.

FIG. 4 is a structural view of the optical filter according to a second embodiment of this invention.

DESCRIPTION OF THE PREFERRED EMBODIMENT

Figure 1:
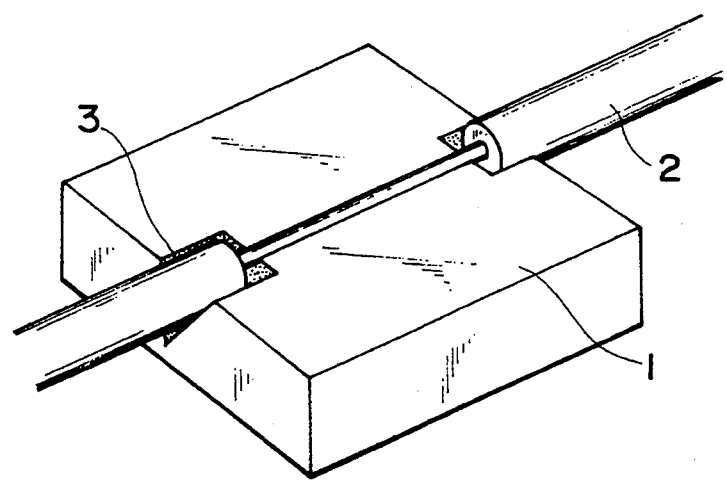
FIG. 1 is an explanatory view of a fabrication process of a conventional optical filter, especially a former half of the fabrication process.
Figure 2:
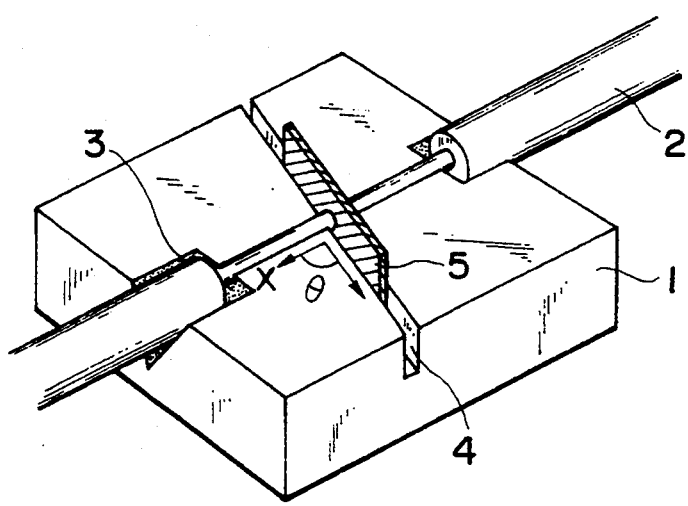
FIG. 2 is an explanatory view of a fabrication process, especially a latter half of the fabrication process.

The structure of the optical filter according to this invention will be explained by means of embodiments shown in FIGS. 3 to 18. Common members among the embodiments are represented by the same reference numerals.

As shown in FIG. 3, an optical filter according to a first embodiment includes a first region 10 for propagating light, which is formed of a glass material and doped with a rare earth element which selectively absorbs light of a specific wavelength, and a second region 20 for confining light which has been propagated through the first region, formed of a glass material having a lower refractive index than the first region.

The rare earth element is preferably an element which is selective of a wavelength in a wavelength range which is important for the optical communication. The rare earth element is typically Er and Tm. Er has a peak absorption wavelength around 1.53 μm in quartz glass. Tm has a peak absorption wavelength around 1.57 μm in quartz glass. Both or either of Er and Tm are doped into the first region 10 to realize an optical filter having the function of selecting a required wavelengths and made of a glass material.

On the other hand, as shown in FIG. 4, an optical filter according to a second embodiment of this invention has a configuration of the optical filter (FIG. 3) according to the first embodiment which is elongated in the direction of propagation of light.

In an application of the second embodiment, the above-described wavelength selecting function is realized in an optical fiber. In this application, the core of the optical fiber corresponds to the first region 10 of the first embodiment.

Next, the wavelength selecting function of the optical filter according to this invention will be explained using a single mode fiber.

Figure 6:
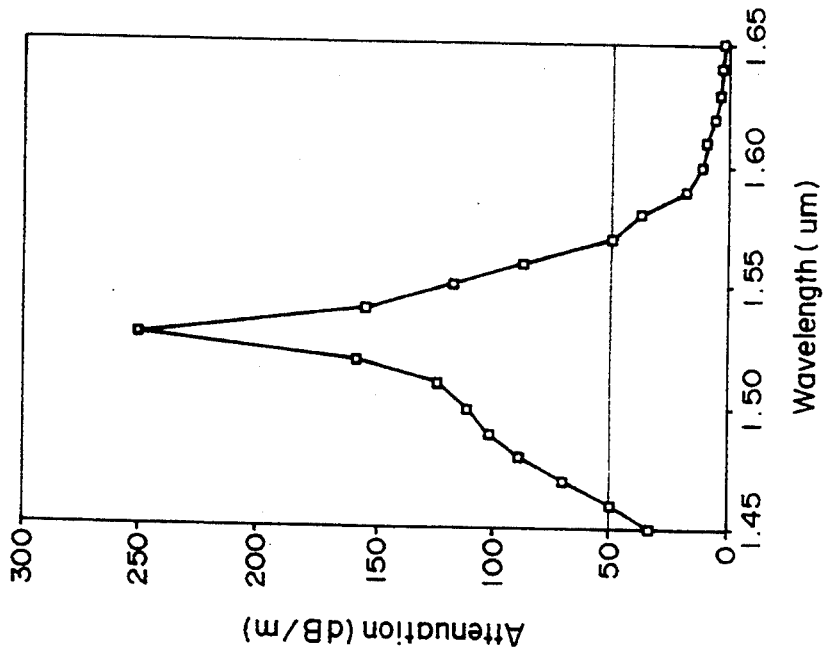
FIG. 6 is a loss spectrum showing relationships between wavelengths and attenuation in the case that a 1.55 μm-band light is propagated through an Er-doped single mode optical fiber.
Figure 5:
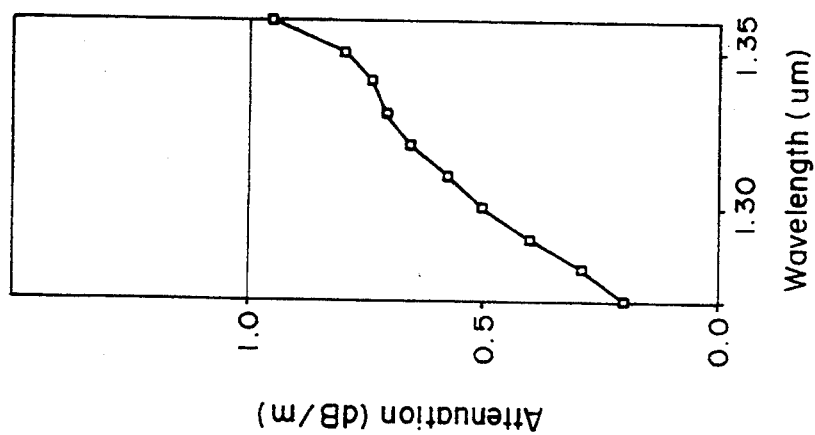
FIG. 5 is a loss spectrum showing relationships between wavelengths and attenuation in the case that a 1.3 μm-band light is propagated through an Er-doped single mode optical fiber.

FIGS. 5 and 6 show spectrum of attenuation (dB/m) in a 1.3 μm band and a 1.55 μm band of a single mode optical fiber having the core (corresponding to the first region 10 of FIG. 3 and the core of FIG. 4) doped with Er. In particular, FIG. 5 shows a spectrum of attenuation in a 1.3 μm band of the single mode optical fiber doped with Er by 3 wt %, and FIG. 6 shows a loss spectrum of attenuation of the single mode optical fiber in a 1.55 μm band.

The attenuation is caused mainly by light absorption of the Er and the Tm doped into the core region.

Figure 8:
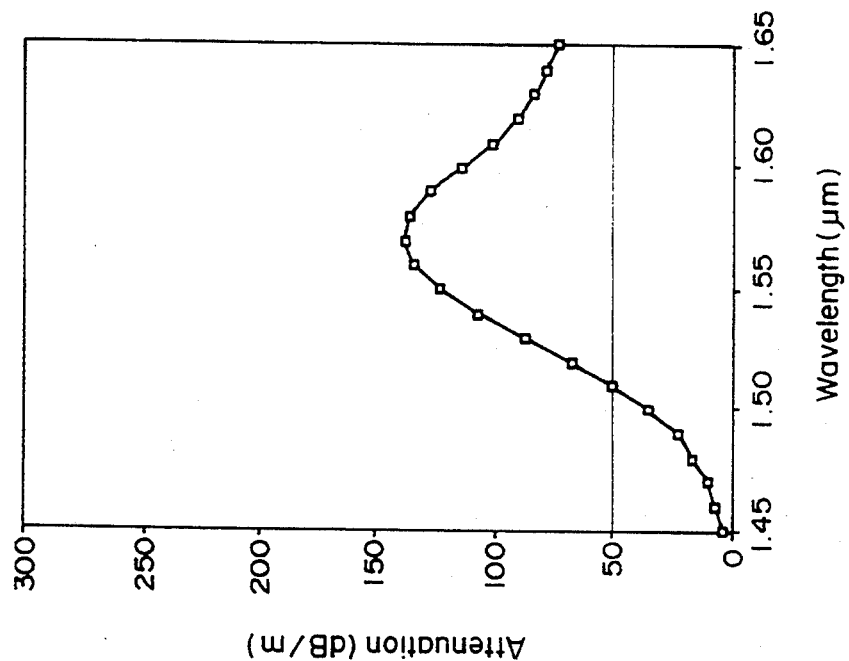
FIG. 8 is a loss spectrum showing relationships between wavelengths and attenuation in the case that a 1.55μm-band light is propagated through a Tm-doped single mode optical fiber.
Figure 7:
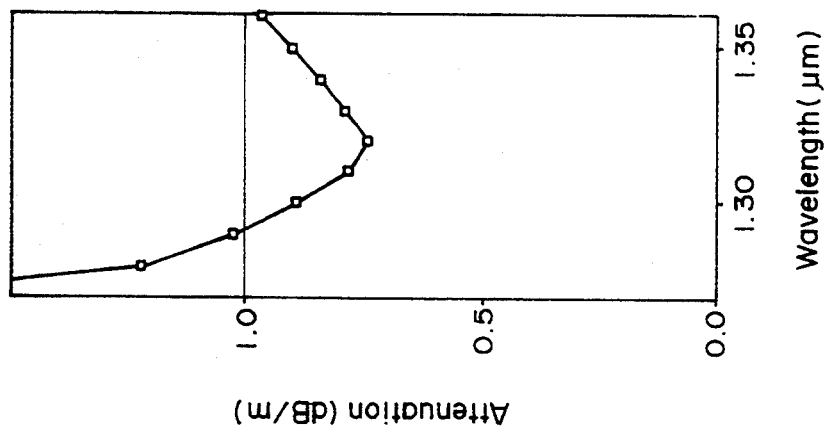
FIG. 7 is a loss spectrum showing relationships between wavelengths and attenuation in the case that a 1.3 μm-band light is propagated through a Tm-doped single mode optical fiber.

Similarly FIG. 7 shows a spectrum of attenuation of a single mode optical fiber with Tm added to by 0.4 wt % in a 1.3 μm band. FIG. 8 shows a spectrum of attenuation of the single mode optical fiber in a 1.55 μm band. These single mode optical fibers respectively doped with Er and Tm have the cores formed of quartz glass containing 6 wt % of $GeO_2$ and 4 wt % of $Al_2O_3$, and have the cladding formed of quartz glass. A diameter of the core is about 9 μm, and an outer diameter of the cladding is about 125 μm.

As seen from FIGS. 5 to 8, by using the respective single mode optical fibers doped with Er and Tm, attenuation in a 1.55 μm band (1.51-1.57 μm) is increased to above 50 dB/m with attenuation in a 1.3 μm band suppressed to below 1 dB/m.

Figure 10:
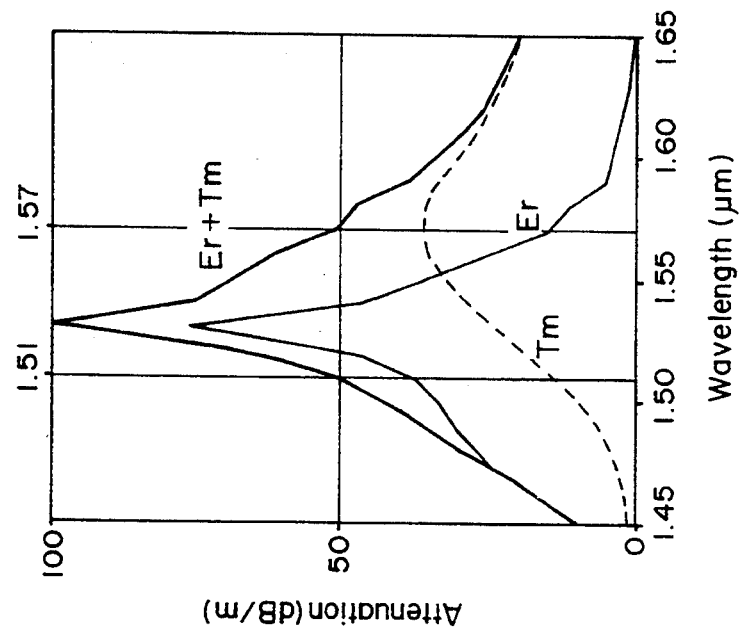
FIG. 10 is a loss spectrum showing relationships between wavelengths and attenuation in the case that a 1.55 μm-band is propagated through an Er- and Tm-doped single mode optical fiber.
Figure 9:
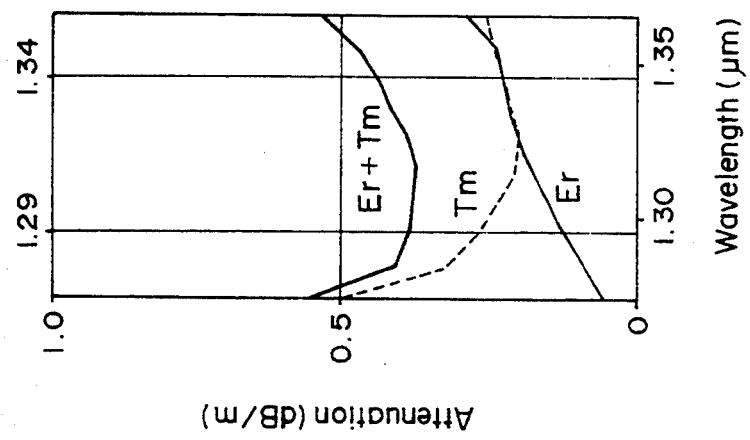
FIG. 9 is a loss spectrum showing relationships between wavelengths and attenuation in the case that a 1.3 μm-band light is propagated through a Er- and Tm-doped single mode optical fiber.

Attenuation of a single mode optical fiber having the core doped with Er (a peak absorption wavelength around 1.53 μm) and Tm (a peak absorption wavelength around 1.57 μm) is shown in FIGS. 9 and 10.

FIG. 9 shows a spectrum of attenuation of the single mode optical fiber having the core doped with 0.9 wt % of Er and 0.1 wt % of Tm in a 1.3 μm band. FIG. 10 shows a loss spectrum of attenuation of the single mode optical fiber having the core doped with 0.9 wt % of Er and 0.1 wt % of Tm in a 1.55 μm band.

In comparison with the case in which Er and Tm are separately doped into the respective single mode optical fibers, it is seen that attenuation of above 50 dB/m takes place around 1.51-1.57 μm (FIG. 10).

Even in comparison with the case of FIGS. 5 and 7 it is seen that attenuation can be suppressed to below 0.5 dB/m in a 1.3 μm band with a total amount of additives decreased (FIG. 9).

Thus to realize the wavelength selecting function it is more effective to dope with both of Er and Tm to the first region 10 than to dope with singly Er or Tm.

Figure 11:
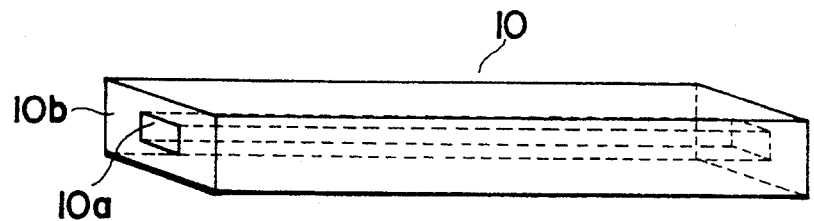
FIGS. 11 to 13 are explanatory views of a first application of the first embodiment of FIG. 3, especially a first region.
Figure 12:
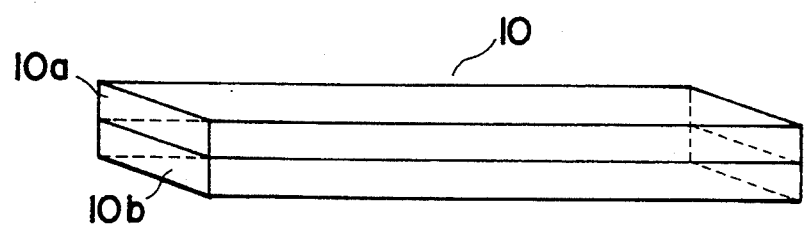
Figure 13:
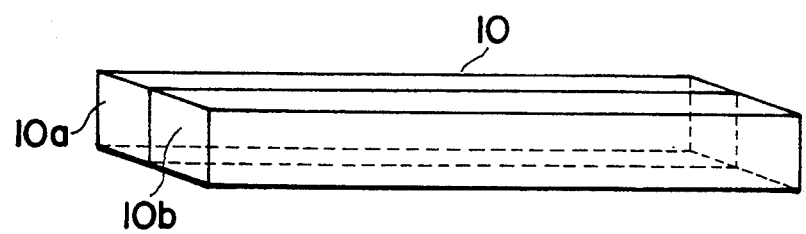

In the above-described first embodiment, the first region 10 is doped with both Er and Tm. In a first application of the first embodiment, as shown in FIGS. 11 to 13, the first region of the application may include a region 10a doped with Er alone and a region 10b doped with Tm alone. In an application of the second embodiment of FIG. 4, the first region 10 of the application may include a plurality of regions as shown in FIGS. 11 to 13.

Figure 14:
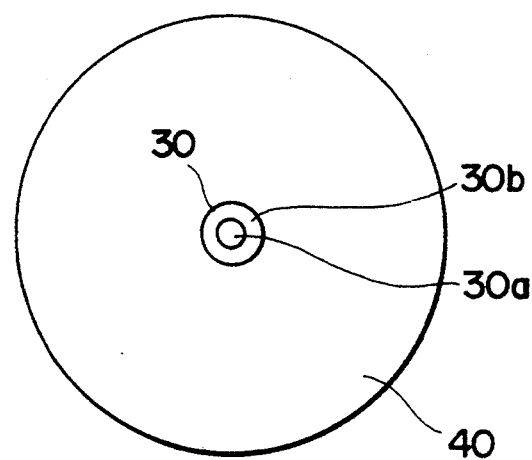
FIG. 14 is an explanatory view of a first application of the second embodiment of FIG. 4, especially a sectional view of a fiber optic filter.

In the second embodiment, when an optical fiber including a core region 30 and a cladding region 40 having different refractive indexes from each other is used (a first example), as exemplified in FIG. 11, the core region 30 (corresponding to the first region 10) may include a region 30a doped with Er alone, and a region 30b doped with Tm alone (FIG. 14). The structure of the core region 30 is not limited to that of FIG. 14, and may be those of FIGS. 12 and 13, and others. As shown in FIG. 12, region 10a may be positioned above region 10b so that the entire lower surface of region 10a is in contact with the upper surface of region 10b. Alternatively, FIG. 13 shows the positioning of region 10a and 10b in a side-by-side manner so that a side of region 10a is in complete contact with a side of 10b.

In these structures, the loss spectrum (FIGS. 9 and 10) can be optionally changed by adjusting sizes of the region 10a and the region 10b.

Figure 15:
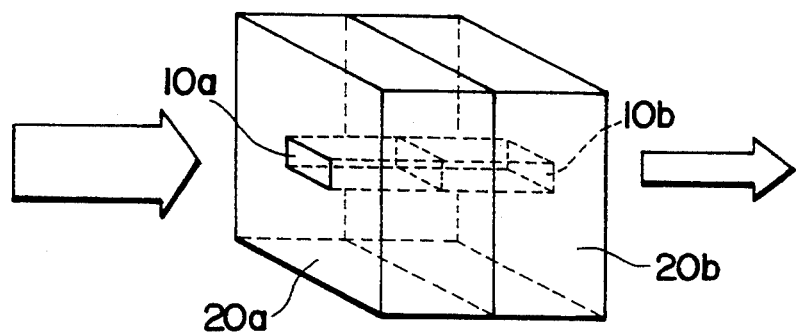
FIG. 15 is an explanatory view of a second application of the first embodiment of FIG. 3.
Figure 16:
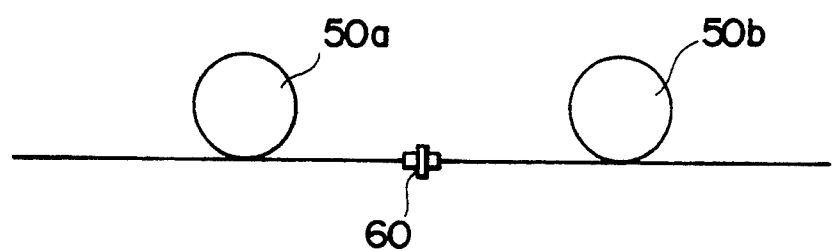
FIG. 16 is an explanatory view of a second application of the second embodiment of FIG. 4, especially a fiber optic filter comprising a first optical fiber doped with Er and a second optical fiber doped with Tm.

Respective second applications of the first and the second embodiments are shown in FIGS. 15 and 16.

FIG. 15 shows a second application of the first embodiment. The second application comprises a first optical filter including a first region 10a doped with Er alone and a second region 20a, and a second optical filter including a first region 10b doped with Tm alone and a second region 20b, the first and the second optical filters being connected to each other serially in the direction of propagation of light.

FIG. 16 shows a second application of the second embodiment (in which optical fibers are used). The second application comprises a first optical filter 50a doped with Er alone and a second optical filter doped with Tm alone, which are connected to each other through a connector 60.

In both applications (FIG. 15 and 16), the loss spectrum (FIGS. 9 and 10) can be optionally changed by adjusting lengths of the respective optical filters (10a, 10b) in the direction of propagation of light or lengths of the respective optical filters (50a, 50b).

Figure 17:
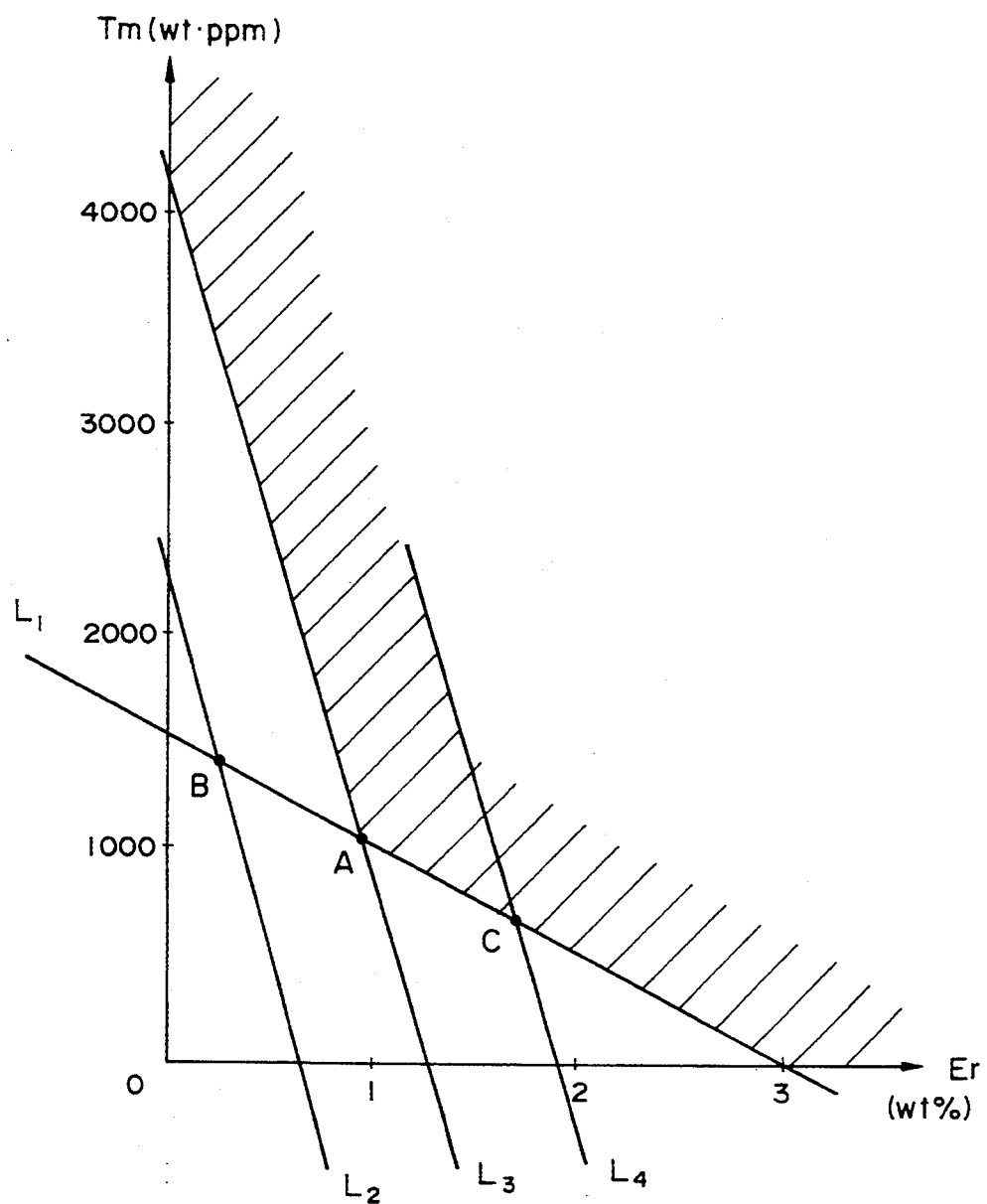
FIG. 17 is a view of equal loss lines of respective wavelengths at doping concentrations of Er and Tm for a single mode optical fiber doped with Er and Tm.

Next, FIG. 17 shows equal loss lines $L_1$-$L_4$ of single mode optical fibers with a 1.2 μm cutoff wavelength and at wavelengths (1.49 μm, 1.51 μm, 1.53 μm and 1.57 μm) for cases in which Er or Tm is homogeneously doped into the core region. FIG. 17 shows relationships between addition amounts of Er (on the horizontal axis in the unit of wt %), and Tm addition amounts (on the vertical axis in the unit of wt.ppm).

Here an equal loss line means a line connecting points at which attenuation amounts are equal for one wavelength. In FIG. 17 relationships between Er addition amounts and Tm addition amounts at which attenuation amounts for the respective wavelengths (1.49 μm, 1.51 μm, 1.53 μm and 1.57 μm). The line $L_1$ is a line in which attenuation is 50 dB/m at 1.57 μm. The line $L_2$ is a line in which attenuation is 50 dB/m at 1.53 μm. The line $L_3$ is a line in which attenuation is 50 dB/m at 1.51 μm. The line $L_4$ is a line in which attenuation is 50 dB/m at 1.49 μm.

In FIG. 17, it is seen that to obtain attenuation of above 50 dB/m at a wavelength of 1.51-1.57 μm, for example, Er and Tm addition amounts corresponding to the shaded region in FIG. 17 are found necessary. This means as shown in FIG. 18 that the composition around the point A in FIG. 17 is found suitable, based on that attenuation in a 1.3 μm band (cases of 1.29 μm wavelength and 1.34 μm wavelength in FIG. 18) decreases lower left as viewed in FIG. FIG. 18 (Er: 0.95 wt %, Tm: 0.105 wt %).

Figure 18:
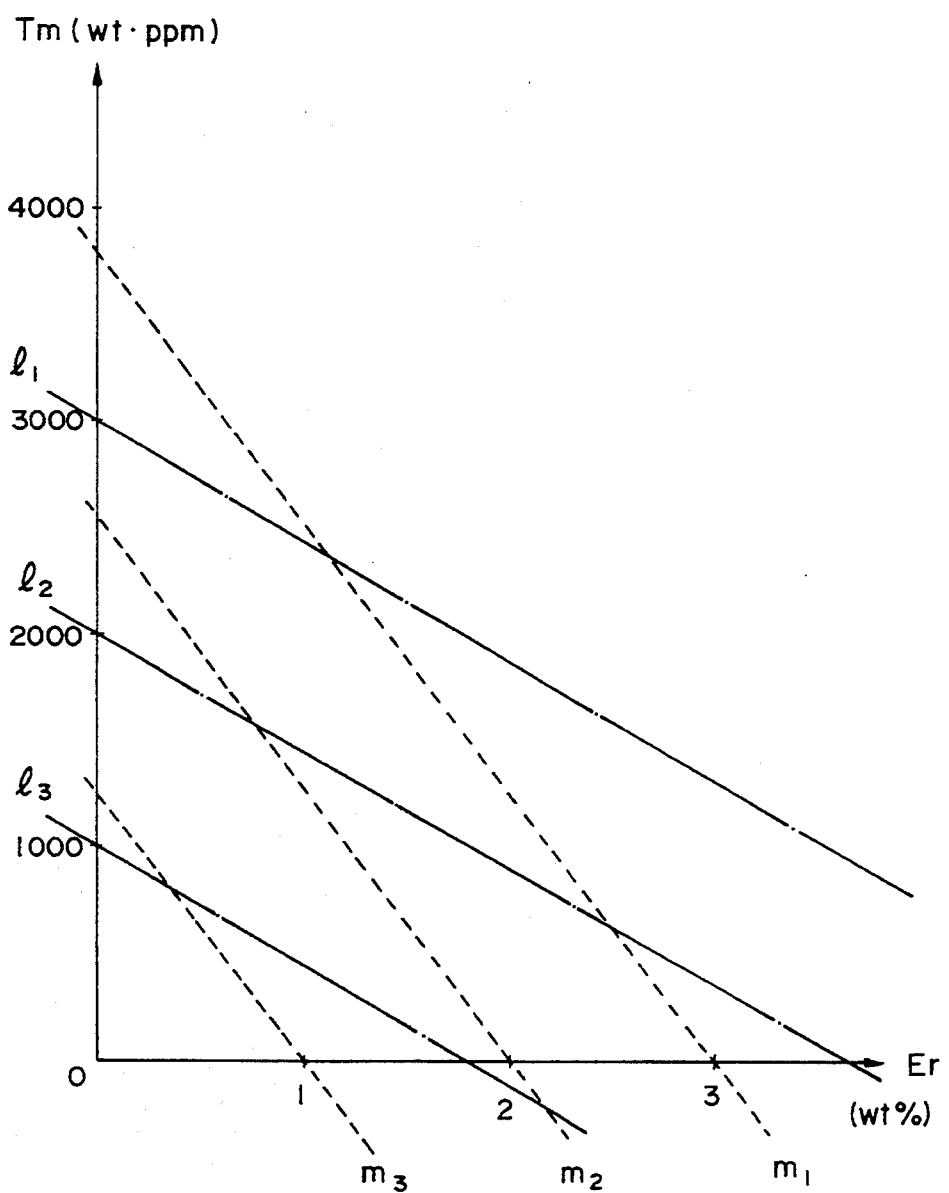
FIG. 18 is a view of equal loss lines of a 1.3 μm band at doping concentrations of Er and Tm for a single mode optical fiber doped with Er and Tm.

The respective equal attenuation lines of FIG. 18 are line $l_1$ in which attenuation is 0.75 dB at 1.29 μm, line $l_2$ in which attenuation is 0.50 dB/m at 1.29 μm, line $l_3$ in which attenuation is 0.25 dB/m at 1.29 μm, line $m_1$ in which attenuation is 1.34 μm at 1.29 μm, line $m_2$ in which 50 dB/m at 1.29 μm, line $m_3$ in which attenuation is 0.25 dB/m at 1.29 μm.

On the other hand, to realize attenuation of above 50 dB/m in a little narrower band of 1.53-1.57 μm, the composition ratio near the point B in FIG. 17 (Er: 0.2 wt %, Tm: 0.14 wt %) is used. Conversely, reversely to obtain high attenuation up to a narrower band (e.g., 1.49 μm), as found near the point C, an Er addition amount may be relatively increased.

In FIG. 17, suitable composition ratios between Er and Tm are shown in concentration ratios (in the unit of wt %). But considering the first and the second applications (FIGS. 11 to 16) of the first and the second embodiments (FIGS. 3 and 4), it is more general to represent suitable composition ratios between Er and Tm in ratios between contribution ratios of Er and of Tm to attenuation for specific wavelengths.

For example, in FIG. 17, for the composition ratio (Er: 0.95 wt %, Tm: 0.105 wt %) at the point A, out of 50 dB/m attenuation at a 1.57 μm an Er contribution is about 16 dB/m (contribution ratio $\alpha_{Er}$=16 (dB/m)/50 (dB/m)=8/25), and a Tm contribution is about 34 dB/m (contribution ratio $\alpha_{Tm}$=34 (dB/m)/50 (dB/m)=17/25). For the composition ratio (Er: 0.2 wt %, Tm: 0.14 wt %) at the point B, out of 50 dB/m attenuation at a 1.57 m an Er contribution is about 2 dB/m (contribution ratio Er $\alpha_{Er}$=2 (dB/m)/50 (dB/m)=1/25), and a Tm contribution is about 48 dB/m (contribution ratio $\alpha_{Tm}$=48 (dB/m)/50 (dB/m)

=24/25). Similarly to obtain attenuation above 50 dB/m in a 1.49-1.57 μm band, optimum values are an Er contribution of about 27.5 dB/m, and a Tm contribution of about 22.5 dB/m.

Thus a ratio $\alpha_{Er}/\alpha_{Tm}$ of contributions ($\alpha_{Er}$, $\alpha_{Tm}$) of Er and Tm in the usual 1.5 μm band to their respective attenuation is $\alpha_{Er}/\alpha_{Tm}$, and specifically the contribution ratio for a wavelength of 1.57 μm is set in a range from about 1 to 1/25.

In the above-described embodiments, optical filters having optical transmittance in a 1.3 μm band, and cutoff characteristic in a 1.55 μm band, but additionally a 1.75 μm band has been recently noted as a new optical transmission wavelength.

In this case, as seen in FIG. 6, doped with Er (3 wt %) singly, transmission characteristic in a 1.65 μm band (i.e., in FIG. 6 with 50 dB/m at 1.57 μm, and about 2 light transmission. By singly doping with Tm or doping with a larger amount of Er than Tm, cutoff characteristic in a 1.64 band can be realized by the optical filter according to the embodiments 1 and 2.

As described above, according to the first embodiment, an optical filter of the function of selecting a required wavelength can be realized by doping Er and Tm amounts into the first region.

In the first application of the first embodiment, the function of selecting a required wavelength can be realized by adjusting sizes of the first region doped with Er alone and the region doped with Tm alone.

In the second application of the first embodiment, the function of selecting a required wavelength can be realized by adjusting lengths of the first and the second optical filters in the direction of propagation of light.

In the first application of the second embodiment, in which especially optical fibers are used, the function of selecting a required wavelength by adjusting sizes of the region doped with Er alone and the region doped with Tm alone, or by lengths of the first optical filter and the second optical fiber which are serially connected to each other.

An optical filter having transmission characteristic in a 1.3 μm band and cutoff characteristic in a 1.55 μm band which are generally used in the optical communication can be realized by setting a ratio $\alpha_{Er}/\alpha_{Tm}$ of contributions of Er and Tm to light absorption at about 1-125 range, and by retaining attenuation at above 50 dB/m in a 1.5 μm band. As described above, this invention can provide an optical filter which can have higher mass-producibility and economy than the conventional optical filters, and can be simply fabricated (simply by connecting the optical filter to an optical fiber as an optical transmission path by fusion or connectors).

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical filter comprising:
    a first region for propagating light, formed of a glass material doped with both Er and Tm which selectively absorb light of specific wavelengths; and
    a second region for trapping light propagating through the first region, formed of a glass material with a lower refractive index than the first region and covering the first region,
    wherein a ratio $\alpha_{Er}/\alpha_{Tm}$ between a contribution $\alpha_{Er}$ of Er to attenuation in the first region and a contribution $\alpha_{Tm}$ of Tm to attenuation in the first region is set in a range from 1 to 1/25 for light of a 1.5 μm band propagating through the first region.

2. An optical filter comprising:
    a first region for propagating light, formed of a glass material doped with at least a first and a second rare earth element which selectively absorb light of specific wavelengths, the first region including:
        a third region doped with Er as the first rare earth element; and
        a fourth region doped with Tm as the second rare earth element; and
    a second region for trapping light propagating through the first region, formed of a glass material with a lower refractive index than the first region and covering the first region,
    wherein a ratio $\alpha_{Er}/\alpha_{Tm}$ between a contribution $\alpha_{Er}$ of Er to attenuation, and a contribution $\alpha_{Tm}$ of Tm to attenuation in the fourth region is set in a range from 1 to 1/25 for light of a 1.5 μm band propagating through the first region comprising the third and the fourth regions.

3. An optical filter according to claim 1, wherein the optical filter is elongated in a direction of propagation of light.

4. An optical filter comprising an optical fiber including a core region and a cladding region with a lower different refractive index than the core region, wherein the core region has a first region doped with Er and a second region doped with Tm, and wherein a ratio $\alpha_{Er}/\alpha_{Tm}$ between a contribution $\alpha_{Er}$ of Er to attenuation in the first region and a contribution $\alpha_{Tm}$ of Tm to attenuation in the first region is set in a range from 1 to 1/25 for light of a 1.5 μm band propagating through the core region.

5. An optical filter comprising:
    a first optical fiber including:
        a first core region for propagating light, formed of a material doped with Er; and
        a first cladding region for trapping light propagating through the first core region, formed of a material with a lower refractive index than the first core region and covering the first core region; and
    a second optical fiber including:
        a second core region for propagating light, formed of a material doped with Tm; and
        a second cladding region for trapping light propagating through the second core region, formed of a material with a lower refractive index than the second core region and covering the second core region,
    wherein the first and the second optical fibers are serially connected in a direction of propagation of light, and
    wherein a ratio $\alpha_{Er}/\alpha_{Tm}$ between a contribution $\alpha_{Er}$ of Er to attenuation in the first optical fiber and a contribution $\alpha_{Tm}$ of Tm to attenuation in the second optical fiber is set in a range from 1 to 1/25 for light of a 1.5 μm band propagating through the respective core regions of the first and second optical fibers.

6. An optical filter comprising:
    a first region for propagating light, formed of a material doped with at least a first and a second rare earth element which selectively absorb light of specific wavelengths, the first region including:
   a third region doped with the first rare earth element; and
   a fourth region doped with the second rare earth element; and
a second region for trapping light propagating through the first region, formed of a material with a lower refractive index than the first region and covering the first region.

7. An optical filter according to claim 6, wherein the third region is adjacent to the fourth region.

8. An optical filter according to claim 6, wherein an entire peripheral surface of the third region is covered by the fourth region.

9. An optical filter according to claim 6, wherein the third and fourth regions are arranged in series with respect to a direction of propagation of light, and wherein the third and the fourth regions are both covered by the second region.

10. An optical filter according to claim 6, wherein the first rare earth element is Er and the second rare earth element is Tm.

11. An optical filter according to claim 6, wherein the optical filter is elongated in a direction of propagation of light.

12. An optical filter according to claim 5, wherein the first and the second optical fibers are respectively elongated in a direction of propagation of light.

13. An optical filter comprising:
a first optical fiber including:
   a first core region for propagating light, formed of a material doped with only a first rare earth element which selectively absorbs light of a specific wavelength; and
   a first cladding region for trapping light propagating through the first core region, formed of a material with a lower refractive index than the first core region and covering the first core region; and
a second optical fiber including:
   a second core region for propagating light, formed of a material doped with only a second rare earth element which selectively absorbs light of a specific wavelength and which is different from the first rare earth element; and
   a second cladding region for trapping light propagating through the second core region, formed of a material with a lower refractive index than the second core region and covering the second core region,
wherein both the first and the second optical fibers are arranged in series with respect to a direction of propagation of light and are directly joined to each other.

14. An optical filter according to claim 13, wherein the first rare earth element is Er and the second rare earth element is Tm.

15. An optical filter according to claim 14, wherein a ratio $\alpha_{Er}/\alpha_{Tm}$ between a contribution $\alpha_{Er}$ of Er to attenuation in the first optical fiber and a contribution $\alpha_{Tm}$ of Tm to attenuation in the second optical fiber is set in a range from 1 to 1/25 for light of a 1.5 μm band propagating through the respective core regions of the first and the second optical fibers.

16. An optical filter according to claim 14, wherein the first and the second optical fibers are respectively elongated in a direction of propagation of light.

* * * * *